(12) United States Patent
Tremblay et al.

(10) Patent No.: US 6,728,898 B2
(45) Date of Patent: Apr. 27, 2004

(54) PRODUCING A MIRRORED COPY USING INCREMENTAL-DIVERGENCE

(75) Inventors: Glenn A. Tremblay, Upton, MA (US); Paul A. Leveille, Grafton, MA (US); Charles H. Kaman, Lincoln, MA (US); Gairy Grannum, Boxborough, MA (US)

(73) Assignee: Marathon Technologies Corporation, Boxboro, MA (US)

( * ) Notice: Subject to any disclaimer, the term of this patent is extended or adjusted under 35 U.S.C. 154(b) by 0 days.

(21) Appl. No.: 10/090,728

(22) Filed: Mar. 6, 2002

(65) Prior Publication Data

US 2003/0172316 A1 Sep. 11, 2003

(51) Int. Cl.[7] ................................................. G06F 11/00
(52) U.S. Cl. .................................................. 714/6; 714/5
(58) Field of Search .................................. 714/5, 6, 7, 8

(56) References Cited

U.S. PATENT DOCUMENTS

| | | | |
|---|---|---|---|
| 5,099,485 A | 3/1992 | Bruckert et al. | 714/11 |
| 5,295,258 A | 3/1994 | Jewett et al. | 714/12 |
| 5,390,313 A | 2/1995 | Yanai et al. | 711/112 |
| 5,487,160 A | 1/1996 | Bemis | 711/114 |
| 5,544,347 A * | 8/1996 | Yanai et al. | 711/162 |
| 5,588,110 A | 12/1996 | DeKoning et al. | 714/5 |
| 5,623,595 A | 4/1997 | Bailey | 714/6 |
| 5,633,999 A | 5/1997 | Clowes et al. | 714/6 |
| 5,742,792 A * | 4/1998 | Yanai et al. | 711/162 |
| 5,787,485 A | 7/1998 | Fitzgerald, V et al. | 711/162 |
| 5,862,314 A * | 1/1999 | Jeddeloh | 714/8 |
| 6,442,706 B1 * | 8/2002 | Wahl et al. | 714/6 |
| 6,487,636 B1 * | 11/2002 | Dolphin et al. | 711/114 |
| 6,549,921 B1 * | 4/2003 | Ofek | 707/204 |
| 2002/0083366 A1 * | 6/2002 | Ohran | 714/13 |
| 2002/0099916 A1 * | 7/2002 | Ohran et al. | 711/162 |
| 2002/0133735 A1 * | 9/2002 | McKean et al. | 714/5 |

OTHER PUBLICATIONS

Davis, Scott, "Design of VMS Volume Shadowing Phase II–Host–based Shadowing," *Digital Technical Journal*, vol. 3, No. 3, Summer 1991, pp. 7–15.

* cited by examiner

*Primary Examiner*—Robert Beausoliel
*Assistant Examiner*—Christopher McCarthy
(74) *Attorney, Agent, or Firm*—Fish & Richardson P.C.

(57) ABSTRACT

Producing a mirror copy using incremental-divergence is performed in a computer system in which write requests are each associated with a reference label. A mirror set may be restored to a state in which the data storage devices contain identical data by copying from the data storage device having "good" data only portions of data which have not been stored on the data storage device having divergent data. Incremental-divergence copying may be accomplished by keeping track of the changes made after a point in which the data storage devices are known to contain identical data.

56 Claims, 7 Drawing Sheets

FIG. 7

PRODUCING A MIRRORED COPY USING INCREMENTAL-DIVERGENCE

TECHNICAL FIELD

This invention relates to techniques for producing a mirrored copy of a disk drive or other storage device.

BACKGROUND

In many computer systems, a level of fault tolerance is provided by storing identical data on each of multiple storage devices. Storage devices having identical data are referred to as mirrored devices and are said to belong to a mirror set. If one mirrored device in a mirror set fails or otherwise becomes inaccessible, the other mirrored device or devices in the mirror set continue to provide access to the data.

To maintain identical data on each device in a mirror set, each device must receive and process every request to store data on the mirror set (i.e., every write request). A device in a mirror set will diverge from other devices in the mirror set if the device is unable to process such write requests. When members of a mirror set become divergent, a mirror set copy may be performed to copy data from one mirrored device to another mirrored device. In one approach to maintaining a mirror set copy, the computer system is shut down and all data are copied from one mirrored device to the other mirrored device.

SUMMARY

In one general aspect, a mirrored copy of a first storage device is maintained at a second storage device in a computer system. The first storage device includes an associated controller, and the second storage device includes an associated controller, volatile storage, and non-volatile storage. Write requests received at the storage devices are processed. A commit-synchronization message is sent to the second storage device along with information designating a write request, and the controller of the second storage device, after receiving the commit-synchronization message, confirms that data associated with the designated write request have been written to the non-volatile storage of the second storage device.

Implementations may include one or more of the following features. For example, the controller of the second storage device may confirm that data associated with all write requests that preceded the designated write request have been written to the non-volatile storage of the second storage device. Alternatively, the controller of the second storage device may process the designated write request and may confirm that data associated with the designated write request and preceding write requests have been written to the non-volatile storage of the second storage device. The controller of the second storage device may confirm a successful cache flush of the volatile storage of the second storage device.

Information sent with the commit-synchronization message may be a reference label identifying a write request processed or to be processed by the first storage device. The reference label may be assigned sequentially relative to reference labels assigned to other write requests. All write requests received at the second storage device may be sequentially processed prior to processing the write request identified by the reference label in the commit-synchronization message.

The identified regions of storage affected by write requests may be accumulated in, for example, a first bit map. After sending the commit-synchronization message, newly-identified regions of storage may be accumulated in a second bit map. After the controller of the second storage device confirms that data in the processed write requests have been written to non-volatile storage of the second storage device, a status message may be sent to the first storage device to indicate that the write data were successfully written to the non-volatile storage. After receipt of the status message indicating that the write data were successfully written, the first bit map may be deleted and the second bit map may be designated as the first bit map.

After a period when the second storage device was unavailable, the contents of the first bit map may be copied to a recovery bit map that then is used to identify the regions of storage of the first storage device to be copied from the first storage device to the second storage device. The identified regions of storage of the first storage device may be copied to the second storage device; and newly-received write requests may be accumulated at the second storage device in a third bit map.

The second storage device may perform one or more of the features and functions as described above with respect to the first storage device, and the first storage device may perform one or more of the features and functions as described above with respect to the second storage device.

In another general aspect, maintaining a mirrored copy of a first storage device at a second storage device in a computer system includes receiving write requests at a first storage device that includes an associated controller, volatile storage, and non-volatile storage; processing the write requests received at the first storage device; receiving write requests at a second storage device that includes an associated controller, volatile storage, and non-volatile storage; and processing the write requests received at the second storage device. After determining that the second storage device is about to enter a period in which the second storage device will be unable to process write requests, the controller of the first storage device sends a commit-synchronization message to the second storage device along with information designating a write request, and the controller of the second storage device, after receiving the commit-synchronization message, confirms that data associated with the designated write request have been written to the non-volatile storage of the second storage device. After sending the commit-synchronization message, the controller of the first storage device accumulates regions of storage affected by new write requests in a bit map. Once the second storage device is able to process write requests again, the controller of the first storage device uses the bit map to identify the regions of storage of the first storage device to be copied from the first storage device to the second storage device and copies the contents of the identified regions of the first storage device to the second storage device.

Implementations of the techniques discussed above may include a method or process, an apparatus or system, or computer software on a computer-accessible medium.

The details of one or more of the implementations are set forth in the accompanying drawings and description below. Other features and advantages will be apparent from the descriptions and drawings, and from the claims.

DESCRIPTION OF THE DRAWINGS

Like reference symbols in the various drawings indicate like elements.

DETAILED DESCRIPTION

Figure 1:
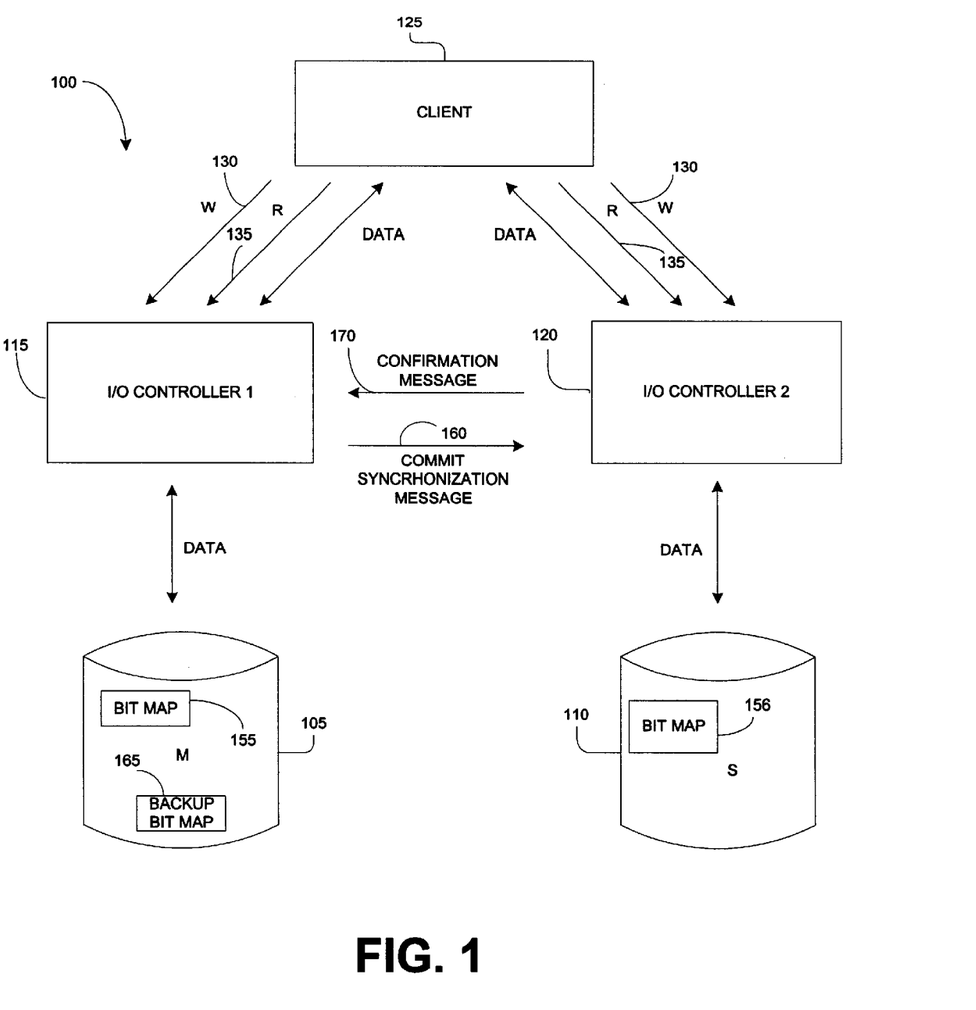
FIG. 1 is a block diagram of a mirrored drive system.

FIG. 1 shows a block diagram of a mirror set 100 that includes a first data storage device 105 and a second data storage device 110. In the implementation of FIG. 1, the data storage devices are disk drives. In other implementations, the data storage devices may be arrays of disk drives or other storage devices.

For ease of description, one of the disks is designated as the master disk and serves as the primary data storage device, while the other disk is designated as the slave disk and serves as a redundant backup. When both disks are active and contain the same data, master/slave status may be assigned arbitrarily to the two disks. Indeed, for purposes of the synchronization techniques described below, two-disk implementations actually maintain two master-slave relationships, with each disk serving as the master in one relationship and the slave in the other. In FIG. 1, the disk 105 has been designated as the master disk while the disk 110 has been designated as the slave disk.

A first I/O ("Input/Output") controller 115 is associated with the first disk 105, and a second I/O controller 120 is associated with the second disk 110. The I/O controllers 115, 120 control the reading and writing of data on the disks.

A client 125, which may be, for example, a processor, sends the same write requests 130 to both I/O controllers. Each write request contains data. In addition, a reference label, such as a sequential reference number, is associated with each write request. The I/O controllers write the data from the write requests to their respective disks so that, under normal conditions, both disks contain identical data. Typically, each I/O controller processes the write requests in the same order. To accomplish this, the I/O controllers process the write requests in order of the reference labels, which means that the I/O controllers do not need to receive the write requests in the same order.

The client 125 also sends read requests 135 to the I/O controllers. In one implementation, when both disks contain the same data, only the master disk responds to the read requests 135. In other implementations, the slave disk or both disks may respond. When the master disk fails or becomes inaccessible, the slave disk is redesignated as the master disk and continues to provide data to the client 125. Thus, if the disk 105 failed, the disk 110 would become the master disk.

A disk in a mirror set 100 will contain divergent data from that of its peer if the disk is unable to process write requests for some period of time. For example, if the slave disk were disabled for a period of time, the data of the slave disk would differ from the data of the master disk. When the disks in a mirror set become divergent, a mirror set copy may be implemented to copy data from the disk having "good" data to the disk having divergent data. For some large storage devices, this process may take a long time, during which the level of fault tolerance of the system is reduced because the mirrored disks do not contain identical data.

To improve the level of fault tolerance of a system, the amount of time required to restore the mirrored disks to a state in which both disks contain identical data (which may be referred to as recovery) may be reduced by copying from the disk having "good" data only portions of data which have not been stored on the disk having divergent data. This process of copying only portions of the disk may be referred to as incremental-divergence copying or delta copying (where delta refers to the changes that have been made to one disk and not another disk).

In general, incremental-divergence copying may be accomplished by slave changes made to one or more mirrored disks such that after a period of unavailability a mirrored disk having divergent data may be restored by copying from the disk having "good" data only the data that have not been stored on the mirrored disk having divergent data. Monitoring changes that have been made to a mirrored disk generally requires keeping track of the changes made after a point in which both mirrored disks in the mirrored set are known to contain identical data, at which point the mirrored disks may be referred to as being synchronized.

The monitoring of changes made to a mirrored disk after a point of synchronization may be problematic when a system, subsystem or processor records a write request as completed when the data has been written to volatile disk cache but the data has not yet been written to the non-volatile storage of the mirrored disk. This issue may be particularly significant when the mirrored data has been striped across more than one disk, for example using RAID ("Redundant Array of Inexpensive Disks") techniques, as the time period from when the write request is placed in the disk cache to when all the data has been written to non-volatile disk storage may be substantial due to the increased time required to write to more than one RAID disk.

The effectiveness of incremental-divergence copying may be improved by periodically synchronizing the data on the mirror disks (e.g., where each disk contains identical data) up to a particular write request reference label by flushing the disk cache and committing the data in the cache to disk storage. Flushing the disk cache ensures that all the write requests that have been processed have been stored in non-volatile disk storage.

Each I/O controller 115, 120 in mirror set 100 keeps track of the write requests 130 made to the I/O controller's respective disk by accumulating the changes made to the disk in a bit map 155, 156. The bit map 155, 156 is a data structure that uses one or more bits to indicate whether each area of a disk has been affected by a write request 150. The bit map in this implementation is stored on the disk. Other implementations may store the bit map in volatile memory until the system is shut down or may save the bit map in non-volatile storage that is not included in the mirror set. The level of abstraction (or granularity) provided by the bit map is based on the size of the storage area represented by a bit. Each bit typically represents substantially more data than is written to a corresponding area of storage by a single write request. Here, the bit map 155, 156 may be referred to as a disk change bit map.

The bit map and the disk may be associated by a unique identifier. The unique identifier, for example, may include a disk identifier that identifies the instance of the client 125 to which the bit map and disk apply. The association of the bit map and the disk may ensure that the changed disk regions are copied to the appropriate disk. For example, the association of a particular bit map with a particular disk or a particular data set on a disk is important when the mirror set includes a removable disk (i.e., a disk that can be removed without opening the computer housing unit).

Periodically, one I/O controller, which may be referred to as a master I/O controller, sends a commit-synchronization message 160 to the other I/O controller, which may be referred to as a slave I/O controller. As shown and described below, the first I/O controller 115 is the master I/O controller and the second I/O controller 120 is the slave I/O controller. However, it is important to note that the second I/O controller 120 is simultaneously serving as the master I/O controller (and the first I/O controller is simultaneously serving as the slave I/O controller) in the relationship in which the disk 110 is the master and the disk 105 is the slave.

The commit-synchronization message 160 identifies a write request reference label up to which the data on the mirrored disks is to be synchronized. The first I/O controller 115 makes a backup copy 165 of the disk change bit map 155 to allow for recovery if a failure occurs during the synchronization process and starts a new disk change bit map to accumulate all subsequent writes to be used in the next synchronization.

When the second I/O controller 120 receives the commit-synchronization message sent by the first I/O controller 115, the second I/O controller determines whether the second I/O controller has already processed the write request identified in the commit-synchronization message and all previous write requests. If not, the second I/O controller waits until it has processed that write request and all previous write requests before initiating the synchronization.

Once the second I/O controller 120 has processed the write request identified in the commit-synchronization message and all previous write requests, or if the second I/O controller had already processed the write request and all previous write requests when the commit-synchronization message was received, the second I/O controller flushes its disk controller cache to commit the processed write requests to non-volatile disk storage. If the cache flush is successful, the second I/O controller 120 sends a confirmation message 170 to the first I/O controller 115. Upon receiving confirmation that the flush and the synchronization were successful, the first I/O controller 115 clears the backup copy 165 of its disk change bit map. In the event that the synchronization is unsuccessful, or if the first I/O controller 115 does not receive a confirmation within a predetermined time, the first I/O controller 115 combines the bit map 155 and the backup 165 (typically by OR-ing), and uses the combined bit map in restoring the second disk 110.

An incremental-divergence copying process that accumulates only changes made to a disk from a particular point forward may be initiated when a disk failure is detected (and thus accumulates only changes made during a period of unavailability) or may be used whenever the system is active (and thus accumulates changes made to the mirrored set at all times during system operation). When changes are accumulated only during the period of unavailability, the period of unavailability must start with a disk controller cache flush for the disk which is becoming unavailable (which may be done when the disk becomes unavailable through a process that may be referred to as a "graceful shutdown") for the incremental-divergence copying process to be effective in restoring the disk after it becomes available.

Another implementation may involve accumulating changes by deleting specific write requests in the disk change bit map rather than starting to accumulate disk changes made after a synchronization point in a different disk change bit map. This may reduce recovery time.

Either I/O controller 115, 120 in mirror set 100 may initiate the commit-synchronization process to insure that both disks contain the same data up through a specific write request reference label. After a period of unavailability, the mirrored disk having divergent data may be restored to being a mirror copy storing identical data by copying only the disk regions that were changed since the last synchronization.

An implementation may involve associating a date (or a date and time) with a particular data set on one of the mirrored disks. This may be beneficial when write request reference labels are not necessarily unique. For example, a write request reference label may not be unique when the reference label is a sequential number that restarts at some fixed value (e.g., one) when the operating system that controls the client is reset. Such write requests may be uniquely identified by associating a date (or a date and time) with the data set when the disk cache of the disk storing the data set is flushed. Alternatively or additionally, when the client is restarted, a mirror set may be given a new instance number to help distinguish non-unique write request reference labels. Other unique identifiers may include, alone or in combination, a client identifier, a mirror set identifier, and a data set identifier.

Although FIG. 1, for illustrative purposes, uses two disks as mirror devices to store the mirrored data sets, the benefits of incremental-divergence copying are not limited to that particular implementation, and are equally applicable to other implementations involving other numbers or types of storage devices, including RAID technology. For example, other implementations may mirror three or more disks, or may provide multiple instantiations of a mirrored disk (e.g., four disks may be used to provide two mirrored sets for the same disk).

Figure 2:
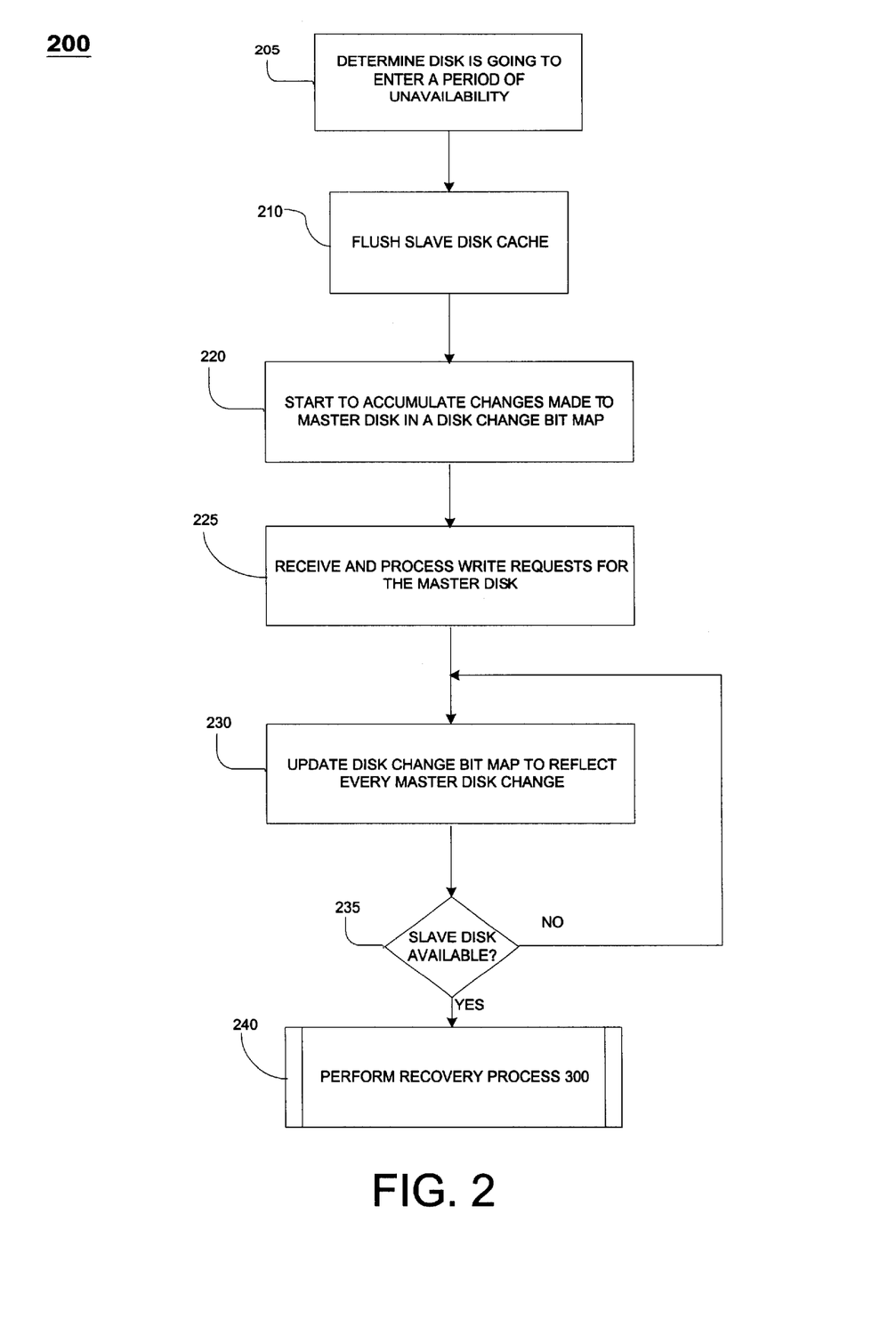
FIG. 2 is a flow chart of a process for monitoring differences between mirrored disks.

Referring to FIG. 2, a process 200 uses incremental-divergence tracking to prepare to restore synchronization to a mirrored disk set that has become divergent during a period in which a disk of the mirrored disk set has become unavailable through a graceful shutdown. The implementation of a mirrored disk set in FIG. 2 has two disk storage devices that are each controlled by a separate I/O controller. Each I/O controller receives the same write requests from a processor and processes the received write requests in sequential order. A reference label is associated with each write request and is used in sequencing the write requests. Another implementation may track whether a particular write request has been processed (or completed). This allows write requests to be processed out of order (i.e., not sequentially). When both disks are active, each disk contains the same data.

The process 200 is initiated when a determination is made that one of the disks is going to enter a period of unavailability (step 205). When this determination is made, the I/O controller for the disk that is becoming unavailable is instructed to commit to non-volatile storage write requests that have been processed by the I/O controller (step 210). The disk becoming unavailable may be referred to as the slave disk, and the active disk may be referred to as the master disk, and the associated I/O controllers may be referred to as the slave I/O controller and the master I/O controller. The master I/O controller starts to accumulate changes made to the master disk in a disk change bit map (step 220), continues to receive and process write requests (step 225), and updates the disk change bit map to reflect every change to the master disk resulting from the processed write requests (step 230). Each bit in the disk change bit map represents a region of the master disk. Other implementations may vary the amount of disk space represented by each bit in the disk change bit map.

The master I/O controller also continues to monitor the status of the slave disk (step 235). When the slave disk becomes available and has begun processing new write requests, the master I/O controller begins a recovery process 300 as described below with respect to FIG. 3 (step 240).

Figure 3:
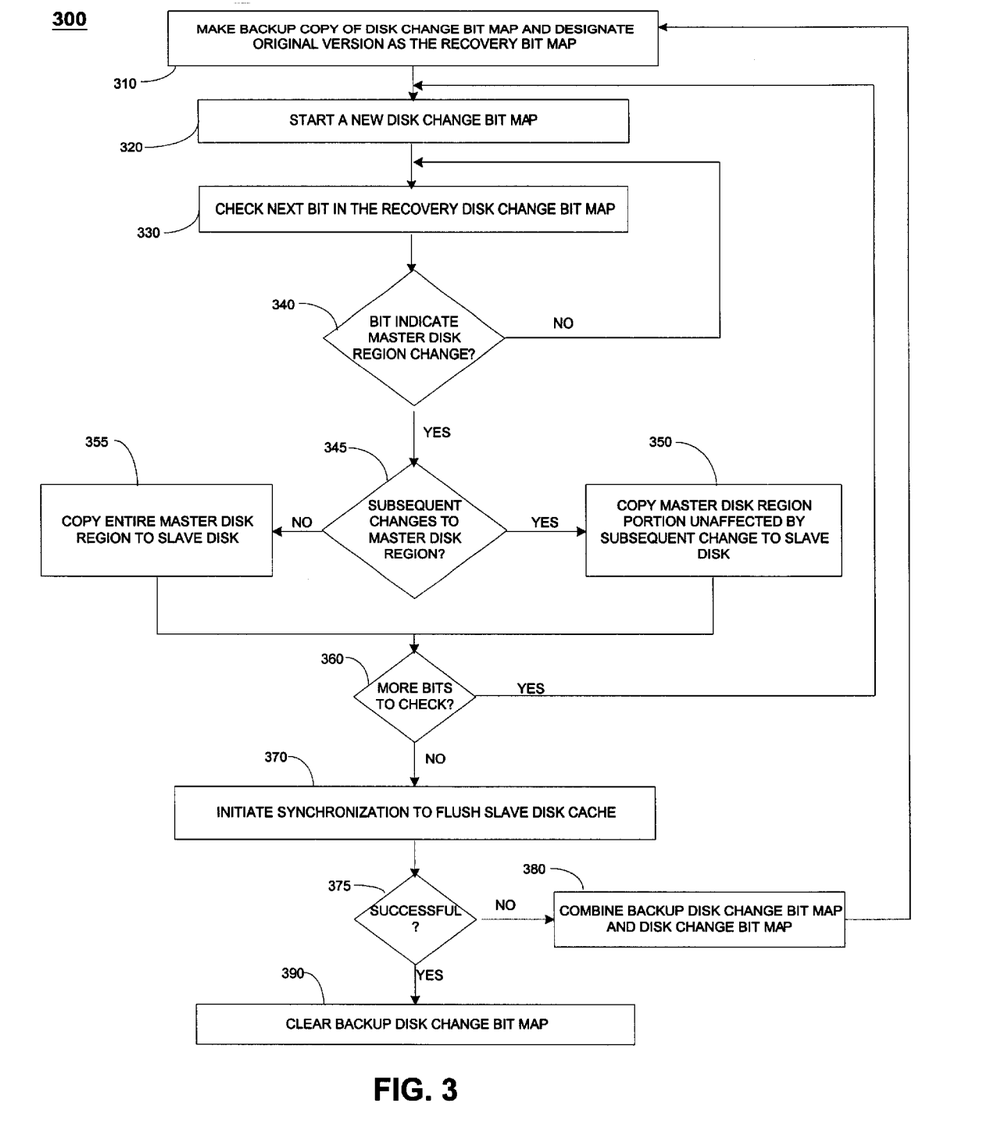
FIG. 3 is a flow chart of a process for recovering synchronization to a mirrored disk set that has become divergent.

Referring to FIG. 3, the recovery process 300 involves copying to the slave disk portions of the master disk as indicated by the disk change bit map. The recovery process occurs as a background process that is active while the mirror set continues to process new write requests. The recovery process 300 begins when the master I/O controller makes a backup copy of the disk change bit map and designates the original version of the disk change bit map as the recovery bit map (step 310). The master I/O controller also starts a new disk change bit map to accumulate all subsequent changes to the master disk (step 320). The backup copy of the disk change bit map and the new disk change bit map allow for recovery if a failure occurs during the recovery process.

The master I/O controller checks each bit in the recovery bit map (step 330) and determines whether the bit indicates that the corresponding master disk region has been changed (step 340). If not, the master I/O controller proceeds to check the next bit in the recovery bit map (step 345). If the bit indicates that the master disk region has been changed, the master I/O controller determines whether subsequent write requests have changed the corresponding disk region of the slave disk (step 345).

If subsequent write requests have changed the corresponding slave disk region, the master I/O controller copies only the portion from the master disk region that corresponds to the portion of the slave disk region that has not been changed by a subsequent write request (step 350). The master I/O controller may identify the portion that has not been changed by having the slave I/O controller maintain a list of write requests processed by the slave disk during the recovery process, with each entry in the list identifying the actual memory portion that was modified. Alternatively, the slave I/O controller may maintain a disk change bit map having finer granularity such that each bit of the bit map corresponds to the smallest portion of the disk that a write request is permitted to modify. To conserve space, the slave I/O controller may maintain a bit map having varying granularity such that a finer granularity map is maintained only for modified portions of the disk.

If no subsequent changes have been made to the slave disk region, the master I/O controller copies the entire master disk region to the slave disk (step 355).

The master I/O controller modifies the portion of the data being copied to avoid a potential inefficiency of writing data which will be overwritten by a subsequent write request (steps 345–355). For instance, if a write request WR-102 changes a portion of the data stored in disk region 12 and a write request WR-155 also changes data stored in a different portion of disk region 12, the process to write data to disk region 12 may change only the portions of region 12 required for each write request.

Additionally or alternatively, the slave I/O controller may modify the portion of data being copied. For instance, if the slave I/O controller has received a new write request that modifies the same disk region that is to be updated by the data copied from the master disk, the slave I/O controller may modify the portion of the data being copied from the master disk.

After copying the master disk region (or portion thereof) to the slave disk, the master I/O controller determines whether more bits in the recovery bit map need to be checked (step 360), and, if so, checks the next bit (step 330).

Recovery is complete when the master I/O controller determines that all the bits in the recovery bit map have been checked. Upon completion, the master I/O controller may optionally initiate a synchronization that flushes the slave disk cache (step 370) to commit the copied data to the slave disk. If the master I/O controller determines that a subsequent synchronization or flush is not successful (step 375), the master I/O controller combines the backup copy of the disk change bit map with the new disk change bit map (typically by OR-ing) (step 380) and repeats the recovery process 300 using the combined disk change bit map. If the slave I/O controller synchronization and slave disk controller flush is successful, the master I/O controller clears the backup disk change bit map (step 390).

Although the implementation discussed with reference to FIG. 2 modifies the level of granularity when copying disk regions from the master disk to the slave disk, another implementation may copy the entire changed region each time without regard to whether a portion of the region will be overwritten by a subsequent write request. The implementation of FIG. 3 processes the recovery bit map during recovery such that it cannot be used a second time. To be able to recover from a failure during the recovery process, a backup copy of the disk change bit map is made prior to processing bits (step 310). Another implementation may not destroy the recovery bit map during recovery, and may be able to recover from a recovery process failure by using the recovery bit map itself. That implementation may not make a copy of the disk change bit map prior to processing bits (step 310). An alternative implementation may not use a new disk change bit map to accumulate master disk changes made after the slave disk has returned to availability but before the recovery process has been successfully completed.

Figure 4:
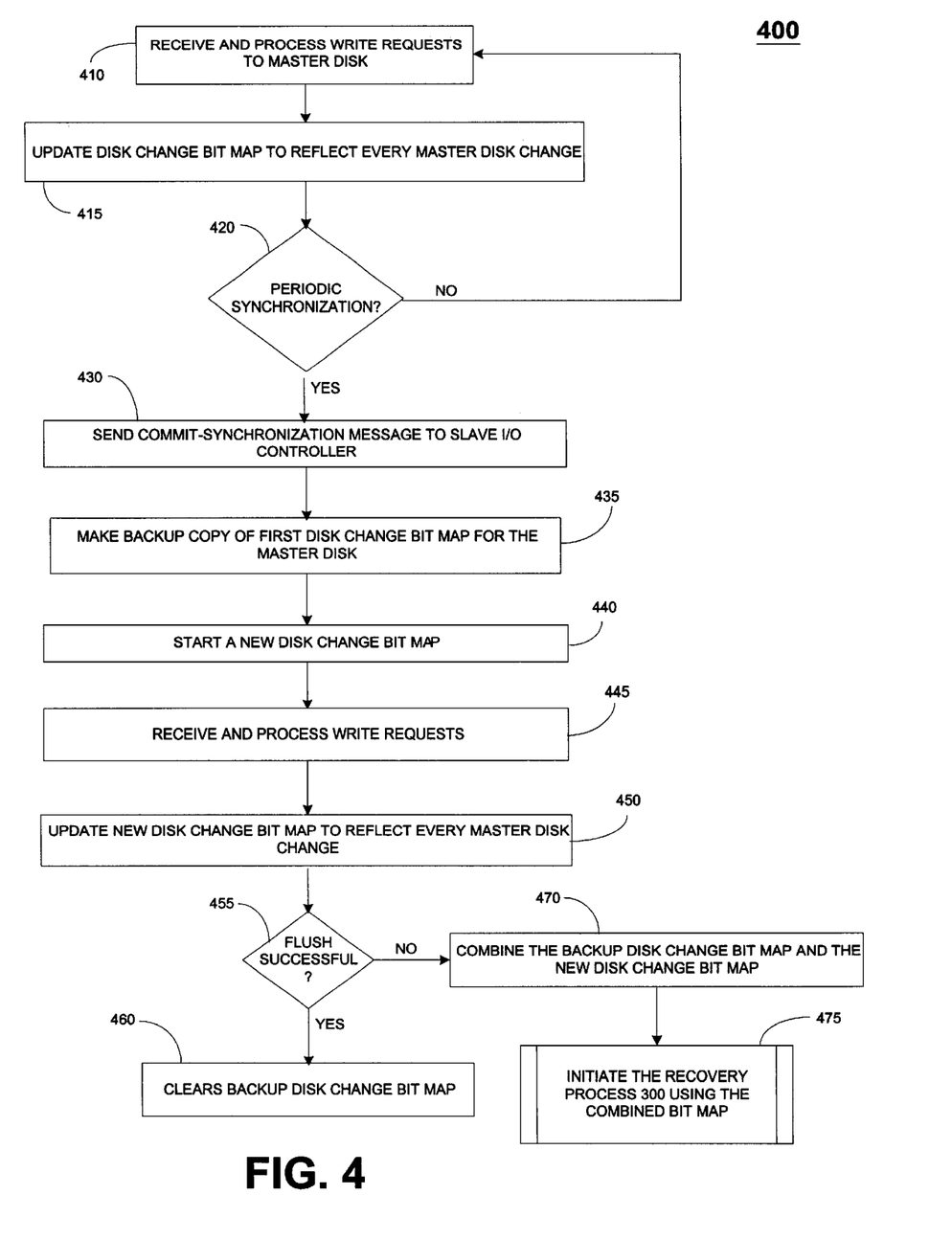
FIG. 4 is a flow chart illustrating a periodic synchronization process as performed by a master input-output controller.
Figure 5:
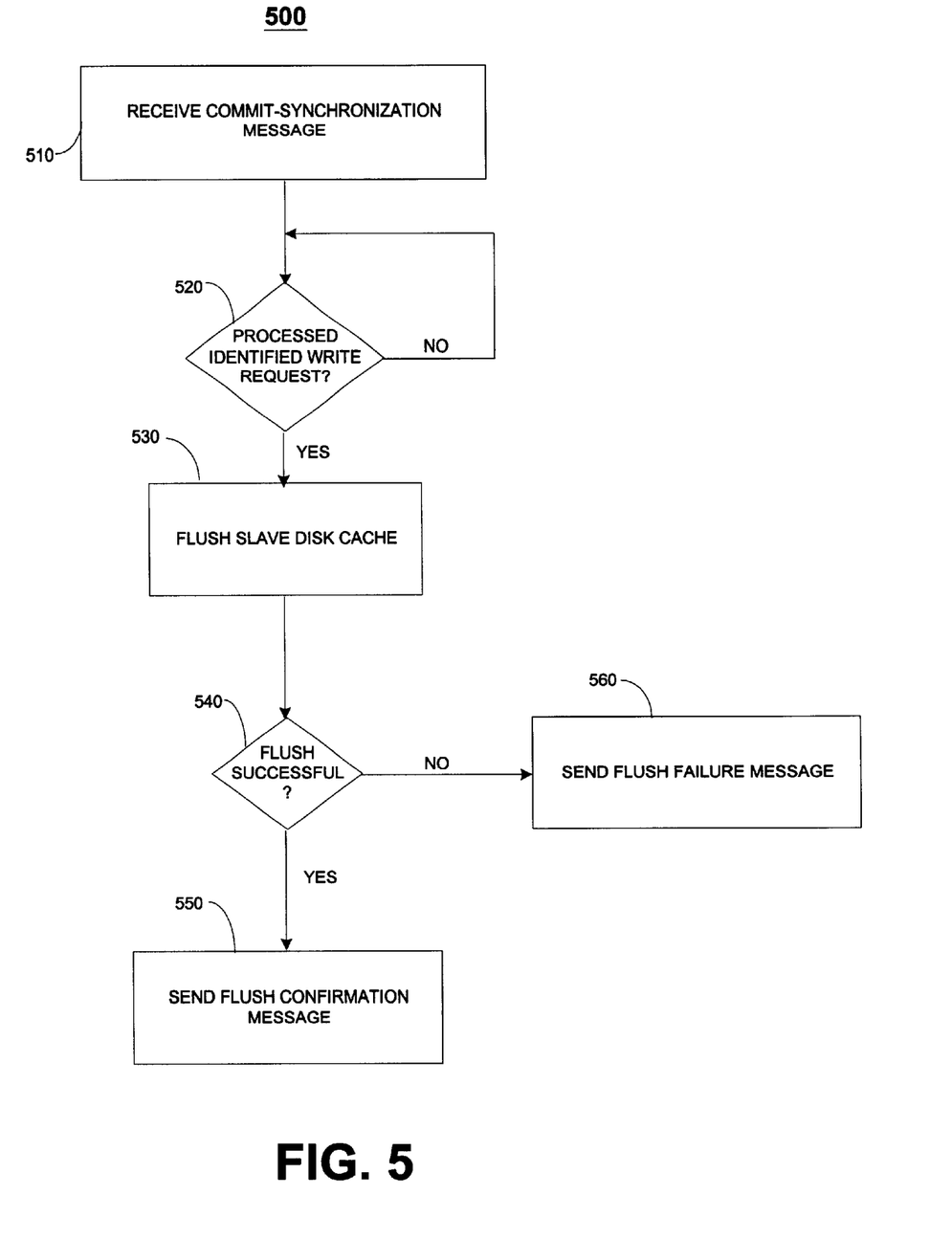
FIG. 5 is a flow chart showing a periodic synchronization process as performed by a slave input-output controller.
Figure 6:
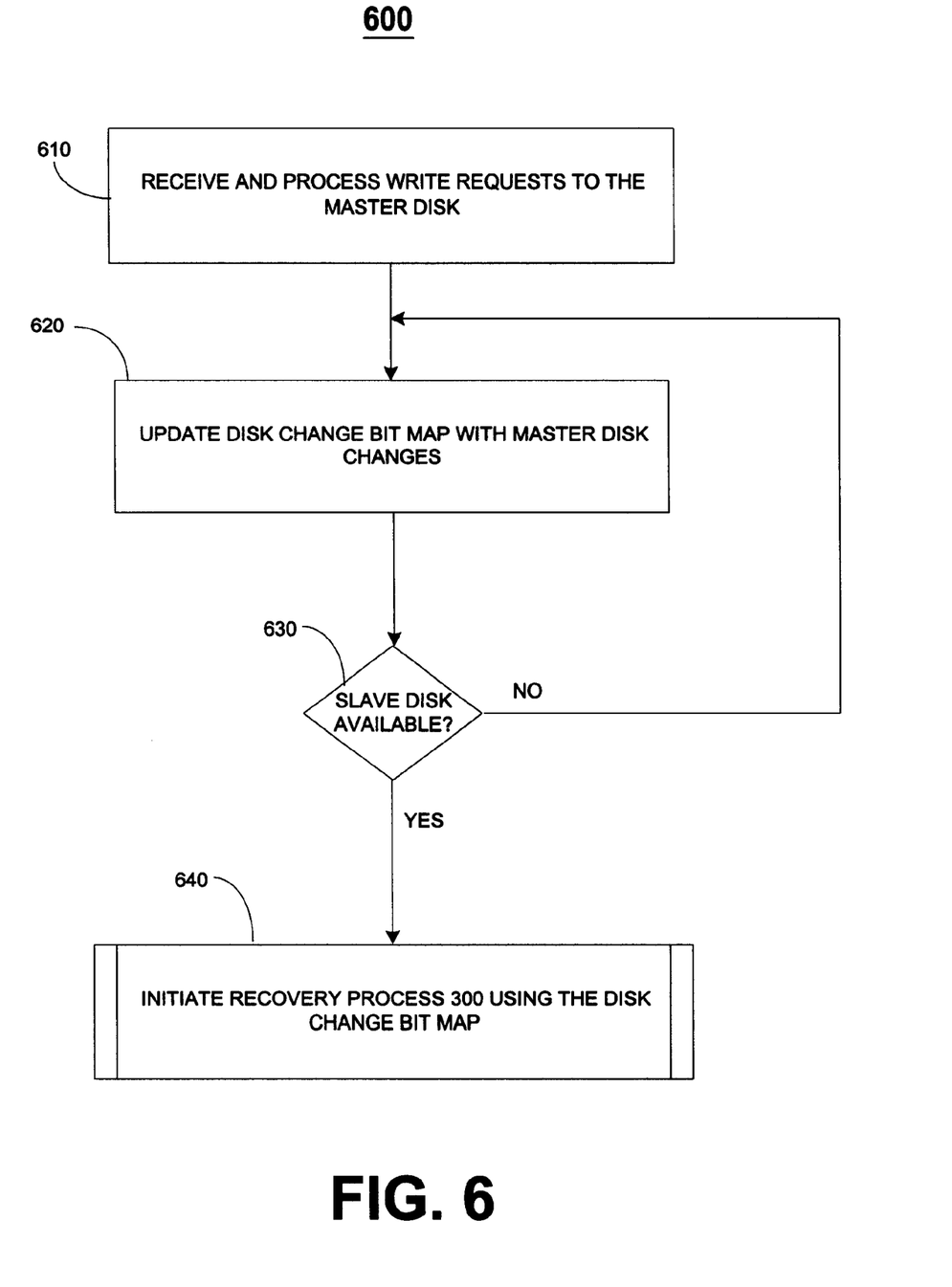
FIG. 6 is a flow chart of a process for restoring a mirrored disk having divergent data to being a mirror copy having identical data.

Referring to FIGS. 4–6, an incremental-divergence copying process may be active whenever the mirror set is used. The implementation of a mirrored set in FIGS. 4–6 has two disk storage devices and two I/O controllers that receive write requests in the manner described with respect to FIG. 2.

Each I/O controller keeps track of the write requests made to the I/O controller's disk by accumulating the changes made to the disk in a disk change bit map. Periodically, one I/O controller (called the master I/O controller) sends a commit-synchronization message to the other I/O controller (called the slave I/O controller) to start a periodic synchronization process. FIG. 4 illustrates a periodic synchronization process as performed by a master I/O controller. FIG. 5 shows a periodic synchronization process as performed by a slave I/O controller. FIG. 6 illustrates a process for restoring a mirrored disk having divergent data to being a mirror copy having identical data.

Referring to FIG. 4, a master I/O controller initiates a process 400 to perform a periodic synchronization with a slave I/O controller. The process 400 begins as a master I/O controller receives and processes write requests from the processor (step 410) and accumulates changes made to the master disk in a disk change bit map (step 415). The master I/O controller determines whether the mirror set should be synchronized (step 420). The master I/O controller may make a commit-synchronization request, for example, after a specified period of time has passed since the last synchronization, after a specified number of write requests have been processed since the last synchronization, or after a fixed percentage of incremental divergence between two mirrored disks. In determining when a synchronization is requested, the frequency of synchronization (which may reduce system performance because flushing the disk cache stops the processing of all write requests during the time when the disk cache is being written to non-volatile storage) may be balanced against the amount of data which is not synchronized between the mirrored disks (which may require a longer amount of time to perform incremental-divergent copying to restore identical data to the mirror set).

When the master I/O controller determines that the mirror set should be synchronized, the master I/O controller sends a commit-synchronization message to the slave I/O controller (step 430). The commit-synchronization message identifies a write request reference label up to which the data on the mirrored disks is to be synchronized. The master I/O controller makes a backup copy of the disk change bit map (step 435) to allow for recovery if a failure occurs in the synchronization process and starts a new disk change bit map to accumulate disk changes made to the master I/O controller's disk from this point forward for use in the next synchronization (step 440). The master I/O controller continues to receive and process write requests from the processor (step 445) and updates the new disk change bit map to reflect every master disk change (step 450).

Upon receiving confirmation that the cache flush by the slave I/O controller and the synchronization were successful (step 455), the master I/O controller clears the backup disk change bit map (step 460) and the synchronization process ends.

Alternatively, the master I/O controller may determine that the synchronization was unsuccessful (step 455) because, for instance, the master I/O controller did not receive a confirmation message from the slave I/O controller within a predetermined amount of time or the master I/O controller received a message that the synchronization failed. If so, the master I/O controller combines the backup disk change bit map and the new disk change bit map (typically by OR-ing) (step 470) and, upon determining that the slave I/O controller and its associated disk are operational, initiates the recovery process 300 as described with respect to FIG. 3 using the combined disk change bit map to guide which disk regions should be copied from the master disk to the slave disk (step 475).

Referring to FIG. 5, a process 500 begins when a slave I/O controller receives a commit-synchronization message that identifies a write request reference label up to which the data on the mirrored disks is to be synchronized (step 510). The slave I/O controller determines whether the slave I/O controller has already processed the write request identified in the commit-synchronization message and all previous write requests (step 520). If not, the slave I/O controller waits until it has processed that write request and all previous write requests before initiating the synchronization.

Once the slave I/O controller has processed the write request identified in the commit-synchronization message and all previous write requests, or if the slave I/O controller has already processed the write request and all previous write requests when the commit-synchronization message was received, the slave disk controller flushes its cache to commit the processed write requests to non-volatile disk storage (step 530) and determines whether the cache flush was successful (step 540). If the cache flush was successful, the slave I/O controller sends a confirmation message to the master I/O controller (step 550). If the cache flush was not successful, the slave I/O controller sends a failure message to the master I/O controller (step 560). After sending the appropriate message to the master I/O controller, the slave I/O controller ends the process 500.

FIG. 6 illustrates a process 600 for restoring a mirrored disk having divergent data to being a mirror copy storing identical data. The following description assumes that one of the disks (the slave disk) in a mirrored set has previously failed or otherwise become unavailable and that there exists a disk change bit map that contains all changes made to the remaining active disk (the master disk) since the last time that the mirrored set was synchronized. This may be accomplished, for instance, by performing the processes which were described with respect to FIGS. 4–5.

When the slave disk is not available, the master I/O controller continues to receive and process write requests from the processor (step 610) and accumulate changes made to the master disk in the disk change bit map that tracks the disk changes that have been made since the last synchronization (step 620). When the master I/O controller determines that the slave disk has recovered and is able to begin processing write requests (step 630), the master I/O controller begins a recovery process 300 as described with respect to FIG. 3 using the disk change bit map to restore the slave disk to contain data identical to that of the master disk (step 640).

The incremental-divergence copying accomplished by performing processes 400, 500 and 600 differs from that accomplished by performing process 200. In particular, processes 400–600 are effective in reestablishing a mirror disk set during an unexpected disk or controller failure in one of the disks because the disk change bit maps are updated while the mirror set is active. Process 200 is only effective in reestablishing a mirror disk set when warning of an upcoming period of disk unavailability is sufficient to allow a disk cache flush to occur and the start of changes to the remaining active disk to be accumulated in a disk change bit map. However, since the process 200 is only implemented at particular times, it may result in significantly less processing overhead than the processes 400–600.

Figure 7:
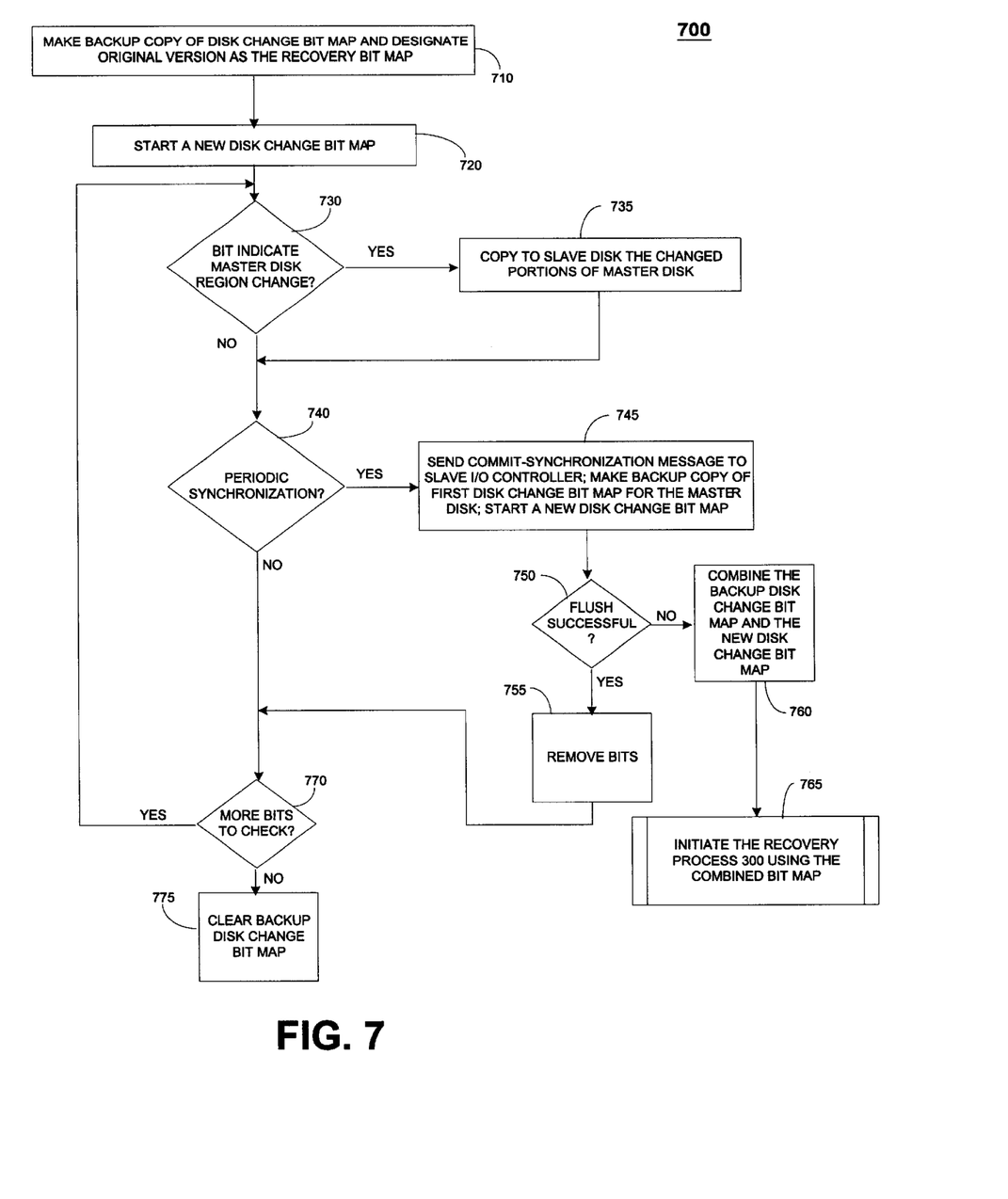
FIG. 7 is a flow chart illustrating a periodic synchronization performed during a recovery process.

Referring to FIG. 7, a recovery process 700 involves performing a periodic synchronization and copying to the slave disk of portions of the master disk as indicated by the disk change bit map. The recovery process 700 begins when the master I/O controller makes a backup copy of the disk change bit map and designates the original version of the disk change bit map as the recovery bit map (step 710). The master I/O controller also starts a new disk change bit map to accumulate all subsequent changes to the master disk (step 720).

As described above with respect to FIG. 3, the master I/O controller checks each bit in the recovery bit map (step 730), and, if the bit indicates that the master disk region has been changed, the master disk copies to the slave disk the changed portions of the master disk (step 735).

As described above with respect to FIG. 4, the master I/O controller periodically initiates a synchronization process with the slave I/O controller. In particular, if the master I/O controller determines that the mirror set should be synchronized (step 740), the master I/O controller sends a commit-synchronization message to the slave I/O controller, makes a backup copy of the disk change bit map, and starts a new disk change bit map to accumulate changes made to the master I/O controller's disk from this point forward (step 745).

Upon receiving confirmation that the cache flush by the slave disk controller and the synchronization were successful (step 750), the master I/O controller removes from the recovery bit map the bits that indicate regions of the master disk that have been successfully copied to the slave disk (step 755). The master I/O controller may accomplish this, for example, by maintaining a list of the bits processed by the master disk during the recovery process and deleting the listed bits from the recovery bit map. However, if the master I/O controller determines that the synchronization was not successful (step 750), the master I/O controller combines the backup disk change bit map and the new disk change bit map (step 760) and initiates the recovery process 300 as described with respect to FIG. 3 using the combined disk change bit map (step 765).

When the master I/O controller has determined that all the bits in the recovery bit map have been checked (step 770), the recovery process is complete and the backup disk change bit map is cleared (step 775). Implementations may include a method or process, an apparatus or system, or computer software on a computer medium. It will be understood that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components.

What is claimed is:

1. A method of maintaining a mirrored copy of a first storage device at a second storage device in a computer system, the method comprising:
   receiving write requests at a first storage device, the first storage device including an associated controller;
   processing the write requests received at the first storage device;
   receiving write requests at a second storage device, the second storage device including an associated controller, volatile storage, and non-volatile storage;
   processing the write requests received at the second storage device;
   sending a commit-synchronization message to the second storage device along with information designating a write request; and
   having the second storage device, after receiving the commit-synchronization message, confirm that data associated with all write requests that preceded the designated write request have been written to the non-volatile storage of the second storage device and that data associated with the designated write request have been written to the non-volatile storage of the second storage device.

2. The method of claim 1 further comprising having the second storage device, after receiving the commit-synchronization message, process the designated write request.

3. The method of claim 1 wherein the information sent with the commit-synchronization message is a reference label identifying a write request processed by the first storage device.

4. A method of maintaining a mirrored copy of a first storage device at a second storage device in a computer system, the method comprising:
   receiving write requests at a first storage device, the first storage device including an associated controller;
   processing the write requests received at the first storage device;
   receiving write requests at a second storage device, the second storage device including an associated controller, volatile storage, and non-volatile storage;
   processing the write requests received at the second storage device;
   sending a commit-synchronization message to the second storage device along with information designating a write request; and
   having the second storage device, after receiving the commit-synchronization message, confirm a successful cache flush of the volatile storage of the second storage device.

5. A method of maintaining a mirrored copy of a first storage device at a second storage device in a computer system, the method comprising:
   receiving write requests at a first storage device, the first storage device including an associated controller;
   processing the write requests received at the first storage device;
   receiving write requests at a second storage device, the second storage device including an associated controller, volatile storage, and non-volatile storage;
   processing the write requests received at the second storage device;
   sending a commit-synchronization message to the second storage device along with information designating a write request; and
   having the second storage device, after receiving the commit-synchronization message, confirm that data associated with the designated write request have been written to the non-volatile storage of the second storage device, wherein the information sent with the commit-synchronization message is a reference label identifying a write request processed by the first storage device and reference labels are assigned sequentially to write requests.

6. The method of claim 5 wherein processing the write requests received at the second storage device further comprises processing write requests in sequential order by their reference labels such that all write requests issued prior to the write request identified by the reference label in the commit-synchronization message are processed prior to processing that write request.

7. The method of claim 5 wherein each storage device receives write requests with the same sequence of reference labels.

8. The method of claim 5 further comprising identifying regions of storage affected by write requests that have been processed at the first storage device.

9. The method of claim 8 wherein identifying regions of storage affected by write requests that have been processed at the first storage device further comprises accumulating the identified regions of storage in a first bit map.

10. A method of maintaining a mirrored copy of a first storage device at a second storage device in a computer system, the method comprising:
    receiving write requests at a first storage device, the first storage device including an associated controller;
    processing the write requests received at the first storage device;
    receiving write requests at a second storage device, the second storage device including an associated controller, volatile storage, and non-volatile storage;

processing the write requests received at the second storage device;

sending a commit-synchronization message to the second storage device along with information designating a write request;

having the second storage device, after receiving the commit-synchronization message, confirm that data associated with the designated write request have been written to the non-volatile storage of the second storage device;

identifying regions of storage affected by write requests that have been processed at the first storage device identifying regions of storage affected by write requests that have been processed at the first storage device;

accumulating the identified regions of storage in a first bit map;

after sending the commit-synchronization message, accumulating newly identified regions of storage in a second bit map;

after the second storage device confirms that data in the processed write requests have been written to non-volatile storage of the second storage device, sending a status message to the first storage device indicating whether the write data were successfully written to the non-volatile storage; and after receiving the status message indicating that the write data were successfully written, deleting the first bit map.

11. The method of claim 10 further comprising after receiving the status message indicating that the write data were not successfully written, copying the contents of the second bit map to the first bit map and deleting the second bit map.

12. The method of claim 10 further comprising, after deleting the first bit map, designating the second bit map as the first bit map.

13. A method of maintaining a mirrored copy of a first storage device at a second storage device in a computer system, the method comprising:

receiving write requests at a first storage device, the first storage device including an associated controller;

processing the write requests received at the first storage device;

receiving write requests at a second storage device, the second storage device including an associated controller, volatile storage, and non-volatile storage;

processing the write requests received at the second storage device;

sending a commit-synchronization message to the second storage device along with information designating a write request; and having the second storage device, after receiving the commit-synchronization message, confirm that data associated with the designated write request have been written to the non-volatile storage of the second storage device; and after a period when the second storage device was unable to process write requests;

copying the contents of the first bit map to a recovery bit map, using the recovery bit map to identify regions of storage of the first storage device to be copied from the first storage device to the second storage device, copying the identified regions of storage of the first storage device to the second storage device, and accumulating newly received write requests at the first storage device in a third bit map.

14. A method of maintaining a mirrored copy of a first storage device at a second storage device in a computer system, the method comprising:

receiving write requests at a first storage device, the first storage device including an associated controller, a volatile storage and a non-volatile storage;

processing the write requests received at the first storage device;

receiving write requests at a second storage device, the second storage device including an associated controller, volatile storage, and non-volatile storage;

processing the write requests received at the second storage device;

sending a commit-synchronization message to the second storage device along with information designating a write request;

having the second storage device, after receiving the commit-synchronization message, confirm that data associated with the designated write request have been written to the non-volatile storage of the second storage device;

sending a second commit-synchronization message to the first storage device along with information designating a second write request; and having the first storage device, after receiving the second commit-synchronization message, confirm that data associated with the designated second write request have been written to the non-volatile storage of the first storage device.

15. The method of claim 14 wherein having the first storage device confirm that data associated with the designated second write request have been written to the non-volatile storage of the first storage device comprises having the first storage device confirm that data associated with all write requests that preceded the designated second write request have been written to the non-volatile storage of the first storage device.

16. The method of claim 15 wherein having the first storage device confirm that data associated with the designated second write request have been written to the non-volatile storage of the first storage device comprises having the first storage device confirm that data associated with the designated second write request have been written to the non-volatile storage of the first storage device.

17. The method of claim 14 further comprising having the first storage device, after receiving the second commit-synchronization message, process the designated second write request.

18. The method of claim 14 wherein having the first storage device confirm that the data associated with the designated second write request have been written to the non-volatile storage of the first storage device comprises having the first storage device confirm a successful cache flush of the volatile storage of the second storage device.

19. The method of claim 14 wherein the information sent with the second commit-synchronization message is a reference label identifying a second write request processed by the second storage device.

20. The method of claim 19 wherein the reference labels are assigned sequentially to write requests.

21. The method of claim 20 wherein processing the write requests received at the first storage device further comprises processing write requests in sequential order by their reference labels such that all write requests issued prior to the write request identified by the reference label in the second commit-synchronization message are processed prior to processing that write request.

22. The method of claim 20 wherein each storage device receives write requests with the same sequence of reference labels.

23. The method of claim 14 further comprising identifying regions of storage affected by write requests that have been processed at the second storage device.

24. The method of claim 23 wherein identifying regions of storage affected by write requests that have been processed at the second storage device further comprises accumulating the identified regions of storage in a fourth bit map.

25. The method of claim 24 further comprising:
   after sending the second commit-synchronization message, accumulating newly identified regions of storage in a fifth bit map,
   after the first storage device confirms that data in the processed write requests have been written to non-volatile storage of the first storage device, sending a status message to the second storage device indicating whether the write data were successfully written to the non-volatile storage, and
   after receiving the second status message indicating that the write data were successfully written, deleting the fourth bit map.

26. The method of claim 25 further comprising after receiving the status message indicating that the write data were not successfully written, copying the contents of the fifth bit map to the fourth bit map and deleting the fifth bit map.

27. The method of claim 25 further comprising, after deleting the fourth bit map, designating the fifth bit map as the fourth bit map.

28. The method of claim 24 further comprising, after a period when the first storage device was unable to process write requests:
   copying the contents of the fourth bit map to a second recovery bit map,
   using the second recovery bit map to identify the regions of storage of the second storage device to be copied from the second storage device to the first storage device,
   copying the identified regions of storage of the second storage device to the first storage device, and
   accumulating newly received write requests at the first storage device in a sixth bit map.

29. The method of claim 14 further comprising associating a unique identifier with a particular data set such that wherein the write request is uniquely identified.

30. The method of claim 29 wherein the unique identifier comprises an instance number.

31. The method of claim 29 wherein the unique identifier comprises a date.

32. A method of maintaining a mirrored copy of a first storage device at a second storage device in a computer system, the method comprising:
   receiving write requests at a first storage device, the first storage device including an associated controller, volatile storage, and non-volatile storage;
   processing the write requests received at the first storage device;
   receiving write requests at a second storage device, the second storage device including an associated controller, volatile storage, and non-volatile storage;
   processing the write requests received at the second storage device;
   after determining that the second storage device is about to enter a period in which the second storage device will be unable to process write requests, having the controller of the first storage device send a commit-synchronization message to the second storage device along with information designating a write request;
   having the controller of the second storage device, after receiving the commit-synchronization message, confirm that data associated with the designated write request have been written to the non-volatile storage of the second storage device;
   after sending the commit-synchronization message, having the controller of the first storage device accumulate regions of storage affected by new write requests in a bit map;
   after the second storage device is able to process write requests, having the controller of the first storage device use the bit map to identify the regions of storage of the first storage device to be copied from the first storage device to the second storage device; and
   copying the contents of the identified regions of the first storage device to the second storage device.

33. A method of maintaining a mirrored copy of a first storage device at a second storage device in a computer system, the method comprising:
   receiving write requests at a first storage device, the first storage device including an associated controller, volatile storage, and non-volatile storage;
   processing the write requests received at the first storage device;
   receiving write requests at a second storage device, the second storage device including an associated controller, volatile storage, and non-volatile storage;
   processing the write requests received at the second storage device;
   having the controller of the first storage device accumulate regions of storage affected by new write requests in a first bit map;
   having the controller of the first storage device send a commit-synchronization message to the second storage device along with information designating a uniquely identified write request;
   having the controller of the second storage device, after receiving the commit-synchronization message, confirm that data associated with the designated write request have been written to the non-volatile storage of the second storage device;
   after sending the commit-synchronization message, having the controller of the first storage device accumulate regions of storage affected by new write requests in a second bit map;
   after the controller of the second storage device confirms that data in the processed write requests have been written to non-volatile storage of the second storage device, sending a status message to the first storage device indicating whether the write data were successfully written to non-volatile storage;
   after receiving the status message indicating that the write data were successfully written, deleting the first bit map;
   after receiving the status message indicating that the write data were not successfully written, copying the contents of the second bit map to the first bit map and deleting the second bit map;

after the second storage device is able to process write requests after a period in which the second storage device was unable to process write requests:

copying the contents of the second bit map to a recovery bit map;

using the recovery bit map to identify regions of storage of the first storage device to be copied from the first storage device to the second storage device;

copying the contents of the identified regions of the first storage device to the second storage device, and having the controller of the first storage device accumulate regions of storage affected by new write requests in a third bit map.

34. The method of claim 33 wherein copying the contents of the identified regions of the first storage device to the second storage device comprises:

having the controller of the first storage device send a commit-synchronization message to the second storage device along with information designating a uniquely identified write request;

having the controller of the second storage device, after receiving the commit-synchronization message, confirm that data associated with the designated write request have been written to the non-volatile storage of the second storage device;

after sending the commit-synchronization message, having the controller of the first storage device accumulate regions of storage affected by new write requests in a fourth bit map;

after the second storage device confirms that data in the processed write requests have been written to non-volatile storage of the second storage device, sending a status message to the first storage device indicating whether the write data were successfully written to non-volatile storage;

after receiving the status message indicating that the write data were successfully written, deleting the third bit map; and after receiving the status message indicating that the write data were not successfully written, copying the contents of the fourth bit map to the third bit map and deleting the fourth bit map.

35. A mirrored data storage system comprising:

a first storage device;

a second storage device;

a first controller associated with the first storage device; and a second controller associated with the second storage device;

wherein:

the first controller is configured to:

receive write requests at a first storage device;

process the write requests received at the first storage; and send a commit-synchronization message to the second storage device along with information designating one write request; and the second controller is configured to:

receive write requests at a second storage device, the second storage device including volatile storage and non-volatile storage;

process the write requests received at the second storage device; and confirm, after receiving the commit-synchronization message and processing the write request identified by the information in the commit-synchronization message, that data associated with all write requests that preceded the designated write request have been written to the non-volatile storage of the second storage device and that data associated with the designated write request have been written to the non-volatile storage of the second storage device.

36. A mirrored data storage system comprising:

a first storage device;

a second storage device;

a first controller associated with the first storage device; and a second controller associated with the second storage device;

wherein:

the first controller is configured to:

receive write requests at a first storage device;

process the write requests received at the first storage; and send a commit-synchronization message to the second storage device along with information designating one write request; and the second controller is configured to:

receive write requests at a second storage device, the second storage device including volatile storage and non-volatile storage;

process the write requests received at the second storage device;

confirm that data associated with the write request identified by the information in the commit-synchronization message have been written to the non-volatile storage of the second storage device after receiving the commit-synchronization message and processing the write request identified by the information in the commit-synchronization message; and confirm a successful cache flush of the volatile storage of the second storage device.

37. The system of claim 36 wherein the information sent with the commit-synchronization message is a reference label identifying a write request processed by the first storage device.

38. A mirrored data storage system comprising:

a first storage device;

a second storage device;

a first controller associated with the first storage device; and a second controller associated with the second storage device;

wherein:

the first controller is configured to:

receive write requests at a first storage device;

process the write requests received at the first storage; and send a commit-synchronization message to the second storage device along with information designating one write request wherein the information sent with the commit-synchronization message is a reference label identifying a write request processed by the first storage device and reference labels are assigned sequentially to write requests; and the second controller is configured to:
receive write requests at a second storage device, the second storage device including volatile storage and non-volatile storage;
process the write requests received at the second storage device;
confirm that data associated with the write request identified by the information in the commit-synchronization message have been written to the non-volatile storage of the second storage device after receiving the commit-synchronization message and processing the write request identified by the information in the commit-synchronization message.

39. The system of claim 38 wherein the second controller is configured to process write requests in sequential order by their reference labels such that all write requests issued prior to the write request identified by the reference label in the commit-synchronization message are processed prior to processing that write request.

40. The system of claim 38 wherein each storage device receives write requests with the same sequence of reference labels.

41. The system of claim 38 wherein the first controller is further configured to identify regions of storage affected by write requests that have been processed at the first storage device.

42. The system of claim 41 wherein the first controller is configured to accumulate the identified regions of storage in a first bit map.

43. A mirrored data storage system comprising:
a first storage device;
a second storage device;
a first controller associated with the first storage device; and
a second controller associated with the second storage device;
wherein:
the first controller is configured to:
receive write requests at a first storage device;
process the write requests received at the first storage;
send a commit-synchronization message to the second storage device along with information designating one write request; and
after sending the commit-synchronization message, accumulate newly identified regions of storage in a second bit map, and after receiving a status message from the second controller indicating that the write data were successfully written, delete the first bit map; and
the second controller is configured to:
receive write requests at a second storage device, the second storage device including volatile storage and non-volatile storage;
process the write requests received at the second storage device;
confirm that data associated with the write request identified by the information in the commit-synchronization message have been written to the non-volatile storage of the second storage device after receiving the commit-synchronization message and processing the write request identified by the information in the commit-synchronization message; and
after the second storage device confirms that data in the processed write requests have been written to non-volatile storage of the second storage device, send the status message to the first storage device indicating whether the write data were successfully written to the non-volatile storage.

44. The system of claim 43 wherein the first controller is further configured to, after receiving the status message indicating that the write data were not successfully written, copy the contents of the second bit map to the first bit map and delete the second bit map.

45. A mirrored data storage system comprising:
a first storage device;
a second storage device;
a first controller associated with the first storage device; and
a second controller associated with the second storage device;
wherein:
the first controller is configured to:
receive write requests at a first storage device;
process the write requests received at the first storage;
send a commit-synchronization message to the second storage device along with information designating one write request; and
after a period when the second storage device was unable to process write requests:
copy the contents of the first bit map to a recovery bit map,
use the recovery bit map to identify regions of storage of the first storage device to be copied from the first storage device to the second storage device,
copy the identified regions of storage of the first storage device to the second storage device, and
accumulate newly received write requests at the first storage device in a third bit map; and
the second controller is configured to:
receive write requests at a second storage device, the second storage device including volatile storage and non-volatile storage;
process the write requests received at the second storage device;
confirm that data associated with the write request identified by the information in the commit-synchronization message have been written to the non-volatile storage of the second storage device after receiving the commit-synchronization message and processing the write request identified by the information in the commit-synchronization message.

46. A computer-readable medium or propagated signal having embodied thereon a computer program configured to maintain a mirrored copy of a first storage device at a second storage device in a computer system, the medium comprising code segments configured to:
receive write requests at a first storage device, the first storage device including an associated controller;
process the write requests received at the first storage device;
receive write requests at a second storage device, the second storage device including an associated controller, volatile storage, and non-volatile storage;
process the write requests received at the second storage device:
send a commit-synchronization message to the second storage device along with information designating a write request; and after receiving the commit-synchronization message, confirm that data associated with all write requests that preceded the designated write request have been written to the non-volatile storage of the second storage device and that data associated with the designated write request have been written to the non-volatile storage of the second storage device.

47. A computer-readable medium or propagated signal having embodied thereon a computer program configured to maintain a mirrored copy of a first storage device at a second storage device in a computer system, the medium comprising code segments configured to:

receive write requests at a first storage device, the first storage device including an associated controller;

process the write requests received at the first storage device;

receive write requests at a second storage device, the second storage device including an associated controller, volatile storage, and non-volatile storage;

process the write requests received at the second storage device;

send a commit-synchronization message to the second storage device along with information designating a write request; and after receiving the commit-synchronization message, confirm a successful cache flush of the volatile storage of the second storage device.

48. The medium of claim 47 wherein the information sent with the commit-synchronization message is a reference label identifying a write request processed by the first storage device.

49. The medium of claim 48 wherein reference labels are assigned sequentially to write requests.

50. The medium of claim 49 wherein processing the write requests received at the second storage device further comprises processing write requests in sequential order by their reference labels such that all write requests issued prior to the write request identified by the reference label in the commit-synchronization message are processed prior to processing that write request.

51. The medium of claim 49 wherein each storage device receives write requests with the same sequence of reference labels.

52. The medium of claim 47 further comprising a code segment configured to identify regions of storage affected by write requests that have been processed at the first storage device.

53. The medium of claim 52 wherein identifying regions of storage affected by write requests that have been processed at the first storage device further comprises accumulating the identified regions of storage in a first bit map.

54. A computer-readable medium or propagated signal having embodied thereon a computer program configured to maintain a mirrored copy of a first storage device at a second storage device in a computer system, the medium comprising code segments configured to:

receive write requests at a first storage device, the first storage device including an associated controller;

process the write requests received at the first storage device;

receive write requests at a second storage device, the second storage device including an associated controller, volatile storage, and non-volatile storage;

process the write requests received at the second storage device;

send a commit-synchronization message to the second storage device along with information designating a write request; and confirm that data associated with the designated write request have been written to the non-volatile storage of the second storage device after receiving the commit-synchronization message;

accumulate newly identified regions of storage in a second bit map after sending the commit-synchronization message;

send a status message to the first storage device indicating whether the write data were successfully written to the non-volatile storage after the second storage device confirms that data in the processed write requests have been written to non-volatile storage of the second storage device; and delete the first bit map after receiving the status message indicating that the write data were successfully written.

55. The medium of claim 54 further comprising a code segment configured to copy the contents of the contents of the second bit map to the first bit map and delete the second bit map after receiving the status message indicating that the write data were not successfully written.

56. A computer-readable medium or propagated signal having embodied thereon a computer program configured to maintain a mirrored copy of a first storage device at a second storage device in a computer system, the medium comprising code segments configured to:

receive write requests at a first storage device, the first storage device including an associated controller;

process the write requests received at the first storage device;

receive write requests at a second storage device, the second storage device including an associated controller, volatile storage, and non-volatile storage;

process the write requests received at the second storage device;

send a commit-synchronization message to the second storage device along with information designating a write request;

confirm that data associated with the designated write request have been written to the non-volatile storage of the second storage device after receiving the commit-synchronization message; and after a period when the second storage device was unable to process write requests:
copy the contents of the first bit map to a recovery bit map,
use the recovery bit map to identify regions of storage of the first storage device to be copied from the first storage device to the second storage device,
copy the identified regions of storage of the first storage device to the second storage device, and
accumulate newly received write requests at the first storage device in a third bit map.

* * * * *